April 9, 1963   M. LEVECQUE ETAL   3,084,380
APPARATUS FOR PRODUCING FIBERS FROM THERMOPLASTIC MATERIAL
Filed March 10, 1958

INVENTORS
MARCEL LEVECQUE
MARCEL MABRU

BY
ATTORNEY

United States Patent Office 3,084,380
Patented Apr. 9, 1963

3,084,380
APPARATUS FOR PRODUCING FIBERS FROM THERMOPLASTIC MATERIAL
Marcel Levecque, Saint-Gratien, and Marcel Mabru, Paris, France, assignors to Compagnie de Saint-Gobain, a corporation of France
Filed Mar. 10, 1958, Ser. No. 720,379
Claims priority, application France Mar. 12, 1957
7 Claims. (Cl. 18—2.5)

The present invention relates to an apparatus for manufacturing fibers from thermoplastic materials, particularly glass fibers, in which the material in a melted state, delivered to and contained in a rotating hollow body provided with openings in its peripheral wall, is projected through these openings under centrifugal action.

The apparatus according to the invention consists in using with the rotating body a gaseous current at high speed and relatively low temperature, in any case lower than the temperature necessary to draw the glass into fine fibers. The gaseous current acts on the fibers or threads of material emitted through the projection orifices in the peripheral wall of the rotating body or centrifuge and moves in a direction transversely and preferably perpendicular to the direction of emission of the threads or fibers from said orifices. The gaseous current may in particular be a current of steam or hot air. The gaseous current exerts on the fibers, from their inception, since they are at a well determined temperature, a localized, strong tempering, due to the relatively low temperature of the current, identical for all the fibers about the circumferential area of the peripheral wall. Applicants have been able to establish that the tempering effected under such conditions permits fibers to be obtained which have excellent mechanical qualities.

The invention contemplates that the gaseous current is guided advantageously over its path, so as to be protected against all external disturbances, caused particularly by induced air, and to increase its efficacy. This arrangement permits identical quality for all the fibers of the same manufacture to be obtained.

Applicants have also established, and this constitutes another characteristic of the invention, that it can be advantageous to combine with the steps and means for putting the above procedures into operation, other steps and means planned to protect the peripheral wall or band with its projection orifices against cooling, and even to increase the temperature of the threads or fibers in the immediate vicinity of the peripheral band or wall of the rotating body. The heating can be limited to the peripheral wall or band carrying the orifices and be realized, by the Joule effect, by direct passage of an electrical current, or preferably by induction. The invention also provides for having a high temperature gaseous current, or flames act upon the peripheral wall or band of the rotating body or centrifuge, and in the immediate vicinity of that wall or band.

The invention provides especially for establishing a hot zone, at substantially homogenous temperature, surrounding the peripheral band, this hot zone being delineated by means of suitable devices, attached to or solid with the centrifuge.

An object of the invention having the foregoing in mind is the formation of fibers from thermoplastic material possessing good mechanical qualities and especially good resistance to traction.

Referring now to the drawings.

In all these forms of the invention, the rotatable body or centrifuge is represented by 1. Its peripheral wall or band 2 is provided with rows of orifices 3.

Figure 1:
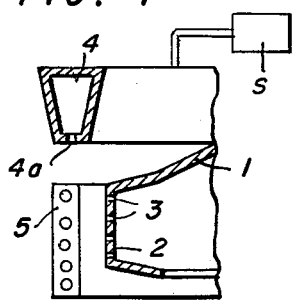
FIGURE 1 is a vertical fragmentary section through the outer portion of a centrifuge provided with a plurality of superposed rows of orifices in its peripheral wall and an annular crown above the centrifuge provided with a slot in its bottom for the delivery of a cool gaseous fluid downwardly past the wall of the centrifuge, with means for heating said wall.

In the forms of realization of FIG. 1, an annular hollow crown 4 having at its lower part a continuous annular slot 4a is provided above and concentric with the rotatable body. This crown with its annular slot 4a may be connected to a source S of the gaseous fluid of low temperature, lower than that necessary to draw out the fibers issuing from the orifices in the band. This gaseous fluid can be air, steam heated gas, whose temperature has been suitably lowered to produce the tempering of the fibers.

The gaseous current issuing from the slot 4a at high speed, acts on the fibers or threads of material emitted by the projection orifices, this action being opposite said orifices and substantially perpendicular to the direction of emission of the threads. This gaseous current at low temperature and high speed, produces energetic and localized tempering of all of the fibers since the fibers are entrained in the current which carries the fibers downwardly and away from the centrifuge. In this form of execution there can be provided induction heating by means of winding 5 through which is passed a high frequency current, in order to maintain the peripheral band 2 at the required temperature.

Figure 2:
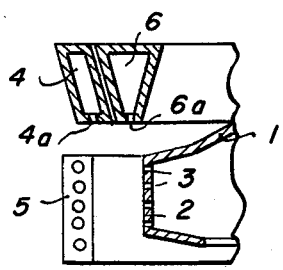
FIGURE 2 is a view similar to FIGURE 1, adding thereto a second annular crown located inwardly of the first crown for delivering hot gases or flames into contact with the centrifuge wall.

In order to avoid detrimental cooling action of the gaseous current of relatively low temperature issuing from the crown slot 4a upon the peripheral band 2 of the rotatable body, a gaseous current of higher temperature can be employed to effect a heating of the peripheral band and the immediate vicinity of that band, as shown in FIG. 2. This gaseous current can be obtained by means of flames or hot gases issuing from a hollow annular crown 6 provided with a slot 6a. The crown 6 is placed concentric to and beside the crown 4 and toward the centrifuge to shield the fibers issuing from the latter from both the attenuating effects and cooling action of the low temperature gaseous current issuing from the crown slot 4a. An induction heating device 5 of the band can also be provided as described in connection with FIG. 1.

Figure 3:
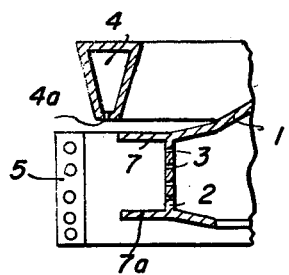
FIGURE 3 is a view similar to FIGURE 1 and shows protective walls or flanges extending outwardly from the edges of the peripheral wall of the centrifuge to restrain cool gases from contacting with the surface of said wall.

In order to protect the peripheral band 2 of the centrifuge against the cooling action of the gaseous current from the crown 4, a device such as that shown in FIG. 3 can be utilized. It comprises annular plates 7—7a concentric to the rotatable body and these plates can be attached respectively at the upper part and lower part of the rotating body at the peripheral band 2. Besides protecting the peripheral band, these annular plates keep the threads at a sufficiently high temperature when they leave the projection orifices 3. These plates can be raised to a temperature equal to or above that of the peripheral band.

Figure 4:
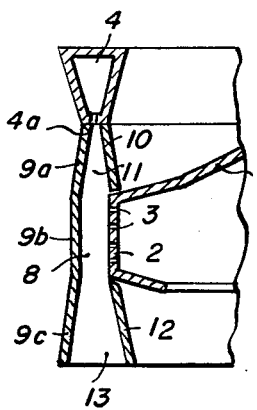
FIGURE 4 is a view showing the peripheral wall of the centrifuge entering a passageway or conduit formed by annular walls extending above and below the peripheral wall and an annular crown provided with an opening in the bottom thereof for discharge of a cool gaseous fluid into the top of the conduit.

FIG. 4 represents an arrangement according to which is provided about the rotatable body, a zone 8 extending over the entire height of the peripheral wall of the body and through which passes the gaseous current of substantially homogeneous temperature. In this form of execution, slot 4a of the crown 4 delivers the gaseous fluid of relatively low temperature into a passage having two annular walls 9a—10 inclined to form a channel 11 with its section increasing in the direction of flow of the gaseous current. From wall 9a, annular wall 9b continues parallel to the peripheral band 2, forming the band zone 8 opposite the rows of orifices 3. The passage then has an annular inclined wall 9c and an annular inclined partition 12 forming between them a channel 13 with its section increasing in the direction of the flow of the gaseous current. Such an arrangement makes it possible to avoid all disturbing currents in zone 8 and notably all induced air currents and a free delivery of the fibers.

Figure 5:
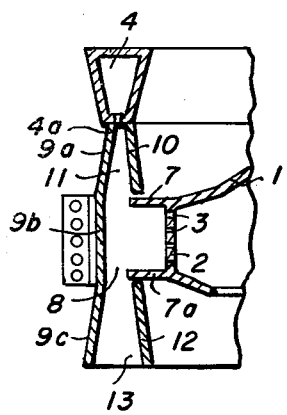
FIGURE 5 is a view similar to FIGURE 4 but shows the centrifuge with the protective flanges of FIG. 3 entering the conduit formed by the annular walls and heating means for maintaining the temperature of the peripheral wall of the centrifuge.

The form of the invention represented in FIG. 5 is similar to that of FIG. 4 but is differentiated by the fact that two annular plates 7—7a are provided, concentric to the rotatable body and according to the arrangement shown in FIG. 3.

Figure 6:
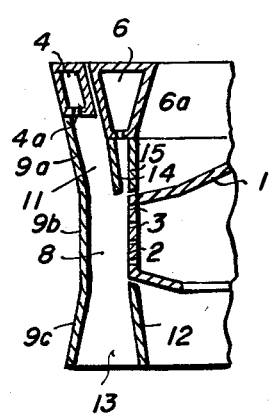
FIGURE 6 shows the centrifuge entering the conduit formed by annular walls surrounding the centrifuge, and extending above and below the same, the wall construction of the conduit being such as to direct hot gases against the peripheral wall of the centrifuge and cool gases past the wall of the centrifuge and spaced therefrom.

In FIG. 6, as in FIG. 2, an admission of gaseous fluid of relatively high temperature is provided to exert a heating action on the peripheral band 2 of the rotatable body so as to maintain the fibers issuing therefrom at the suitable working temperature. Upon its departure from slot 6a in the interior crown 6, the gaseous fluid is channeled by means of the annular walls 14 and 15. Wall 14 is inclined to direct the fluid onto the band 2. The device represented has in addition delineating passages or channels 11—8—13 similar to those of the device of FIG. 5.

Figure 7:
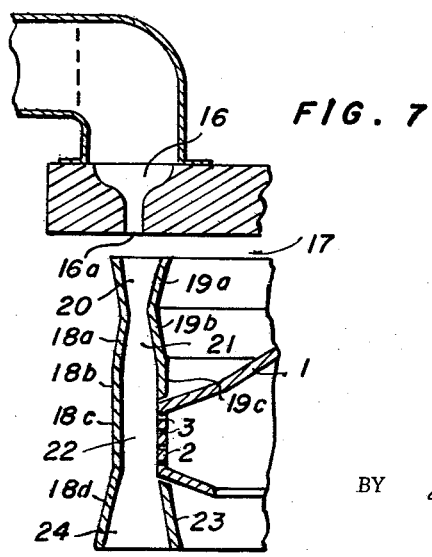
FIGURE 7 shows a centrifuge entering a conduit formed by annular walls surrounding the centrifuge and extending above and below the same and, the conduit having different shapes throughout its height, with means for delivering a cool gaseous fluid to the upper end of the conduit and past the wall of the centrifuge.

FIG. 7 shows a form of execution according to which the gaseous current is produced by means of an annular combustion chamber 16 having a slot 16a and to lower its temperature, this gaseous current is mixed with air admitted laterally at 17. This admission of air can be regulated to give the resultant gaseous current the desired temperature. The gaseous current passes into a passage or conduit whose annular walls 18a—19a are inclined to form channel 20 with decreasing section and whose inclined annular walls 18b—19b then form a channel 21 with increasing section. This channel 21 is followed by a channel 22 of constant horizontal section, the latter being formed by the vertical annular walls 18c—19c and which affects the entire height of the peripheral band 2 as well as a part of the passage situated thereabove. The lower part of the passage is made up of annular walls 18d and 23 forming a channel 24 of increasing section when it leaves channel 22.

What is claimed is:
1. In an apparatus for manufacturing fibers of thermoplastic material and particularly glass fibers, the combination of a centrifuge having a peripheral wall provided with a plurality of superposed rows of orifices, said centrifuge being rotatable at a speed to deliver molten material from the interior thereof through said orifices in fiber form, an annular hollow crown for containing a cool gaseous fluid under pressure having an annular slot at the bottom thereof located above and concentric with the centrifuge and radially outward thereof in close proximity to the centrifuge to discharge said gaseous fluid at high speed downwardly under pressure and closely surrounding the peripheral wall of the centrifuge, and means disposed in a zone between the blast and the peripheral wall for shielding the fibers at the points of issue from the orifices from both the attenuating effects and the detrimental cooling action of said blast.

2. The invention set forth in claim 1 wherein said last-mentioned means comprises flanges extending outwardly from the upper and lower edges of the peripheral wall of the centrifuge.

3. The invention set forth in claim 1 wherein said last-mentioned means comprises a second annular crown located adjacent to and radially inward of the first-named crown and above and concentric with the centrifuge and provided with an annular slot to discharge a gaseous current of high temperature downwardly upon the peripheral wall of the centrifuge and the fibers at the points of issue from said orifices.

4. The invention set forth in claim 3 wherein annular walls are shaped to provide a conduit extending downwardly from the crowns and in communication with the peripheral wall of the centrifuge, and an annular baffle extends downwardly in said conduit from one of said crowns toward the peripheral wall of the centrifuge and spaced from the side walls of the conduit, thereby separating the cool and hot gases from their respective crowns.

5. An apparatus as set forth in claim 1 including means for producing heating effects which traverse said zone and heat locally the peripheral wall of said centrifuge.

6. An apparatus as set forth in claim 5 wherein said last-mentioned means comprises an annular electric induction coil facing the peripheral wall.

7. An apparatus as set forth in claim 1 including a source of cool gaseous fluid connected to said annular crown for discharging the cool fluid therefrom at a temperature lower than that which is imparted to the thermoplastic material for drawing it into fibers.

References Cited in the file of this patent

UNITED STATES PATENTS

| | | |
|---|---|---|
| 2,318,244 | McClure | May 4, 1943 |
| 2,431,205 | Slayter | Nov. 18, 1947 |
| 2,578,101 | Stalego | Dec. 11, 1951 |
| 2,582,561 | Peyches | Jan. 15, 1952 |
| 2,597,062 | Cardella et al. | May 20, 1952 |
| 2,609,566 | Slayter et al. | Sept. 9, 1952 |
| 2,624,912 | Heymes et al. | Jan. 13, 1953 |
| 2,936,480 | Kleist | May 17, 1960 |
| 2,981,974 | Levecque et al. | May 2, 1961 |

FOREIGN PATENTS

| | | |
|---|---|---|
| 1,124,487 | France | July 2, 1956 |
| 202,877 | Australia | July 5, 1956 |